United States Patent
Chung et al.

(10) Patent No.: US 9,537,541 B2
(45) Date of Patent: Jan. 3, 2017

(54) METHOD AND APPARATUS FOR ACTIVATING SCAN FUNCTION

(71) Applicant: Samsung Electronics Co., Ltd., Gyeonggi-do (KR)

(72) Inventors: Jin-Yong Chung, Seoul (KR); Su-Hwan Kim, Gyeonggi-do (KR); Tae-Sung Kim, Gyeonggi-do (KR); Soo-Yong Kim, Gyeonggi-do (KR); Ji-Myung Na, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/806,113

(22) Filed: Jul. 22, 2015

(65) Prior Publication Data

US 2016/0065270 A1    Mar. 3, 2016

(30) Foreign Application Priority Data

Sep. 1, 2014    (KR) .......................... 10-2014-0115554

(51) Int. Cl.
| | | |
|---|---|---|
| *H04B 5/00* | (2006.01) | |
| *H04L 29/08* | (2006.01) | |
| *H04W 4/06* | (2009.01) | |

(52) U.S. Cl.
CPC .......... *H04B 5/0062* (2013.01); *H04B 5/0031* (2013.01); *H04L 67/12* (2013.01); *H04W 4/06* (2013.01)

(58) Field of Classification Search
CPC .............. G06K 7/0008; G06K 19/0723; G06K 7/10297; G06K 7/10009; G06K 7/10356; G06K 7/10128

USPC ....................................................... 340/10.3
See application file for complete search history.

(56) References Cited

U.S. PATENT DOCUMENTS

| | | |
|---|---|---|
| 7,079,811 B2 | 7/2006 | Lee et al. |
| 8,219,093 B2 | 7/2012 | Lee et al. |
| 8,385,985 B2 | 2/2013 | Burke et al. |
| 8,644,892 B2 | 2/2014 | Maguire |
| 9,319,968 B2 * | 4/2016 | Montemurro ......... H04W 48/16 |
| 2013/0016635 A1 | 1/2013 | Linsky et al. |
| 2013/0045684 A1 | 2/2013 | Linde et al. |
| 2013/0090061 A1 | 4/2013 | Linde |
| 2013/0253701 A1 | 9/2013 | Halloran et al. |
| 2014/0064152 A1 * | 3/2014 | Li .......................... H04W 4/18 370/259 |

(Continued)

FOREIGN PATENT DOCUMENTS

| | | |
|---|---|---|
| KR | 1020080004102 | 1/2008 |
| KR | 1020080085332 | 9/2008 |

(Continued)

*Primary Examiner* — Mark Blouin
(74) *Attorney, Agent, or Firm* — The Farrell Law Firm, P.C.

(57) ABSTRACT

A method and electronic device for receiving information is provided. The method includes transmitting, by the electronic device, a scan time and an identification of the information to cause the identified information to be broadcast at the scan time; and scanning, by the electronic device, during the scan time to receive the information. The electronic device includes a transmitter configured to transmit a scan time and an identification of the information to cause the identified information to be broadcast at the scan time; and a scanner configured to scan during the scan time to receive the information.

10 Claims, 10 Drawing Sheets

(56) References Cited

U.S. PATENT DOCUMENTS

2014/0079043 A1* 3/2014 Montemurro ..... H04W 52/0216
  370/338
2014/0094198 A1   4/2014 Heo et al.

FOREIGN PATENT DOCUMENTS

| KR | 1020130141994 | 12/2013 |
| KR | 1020140042534 | 4/2014 |

* cited by examiner

| Message Type Indicator | Direction | Message Type |
|---|---|---|
| 0 | MWS ↔ Bluetooth | Real-time Signal message |
| 1 | MWS ↔ Bluetooth | Transport Control message |
| 2 | MWS ↔ Bluetooth | Transport Data message |
| 3 | MWS ↔ Bluetooth | MWS Inactivity Duration message |
| | Bluetooth ↔ MWS | RFU |
| 4 | MWS ↔ Bluetooth | MWS Scan Frequency message |
| | Bluetooth ↔ MWS | RFU |
| 5 | MWS ↔ Bluetooth | RFU |
| | Bluetooth ↔ MWS | RFU |
| 6 | | Vendor specific |
| 7 | | Vendor specific |

FIG.9

METHOD AND APPARATUS FOR ACTIVATING SCAN FUNCTION

PRIORITY

This application claims priority under 35 U.S.C. §119(a) to a Korean Patent Application filed on Sep. 1, 2014 in the Korean Intellectual Property Office and assigned Serial No. 10-2014-0115554, the entire content of which is incorporated herein by reference.

BACKGROUND

1. Field of the Disclosure

The present disclosure relates generally to a method and an apparatus for activating a scan function of an electronic device, and more particularly, to a method and an apparatus for determining an activation period of a scan function in an electronic device.

2. Description of the Related Art

According to a development of an Internet Protocol version 6 (IPv6), a unique IP may be allocated to an object. After a unique IP is allocated to an object, the object may access an Internet network, and transmit and receive data. Accordingly, an Internet of objects (e.g., an Internet of Things (IoT)) is possible, and research on smart home systems for effectively utilizing an automatic device has been actively pursued. A smart home system refers to a system in which a plurality of devices is registered to one electronic device to effectively and intuitively control the plurality of registered devices.

However, since the types of devices for the Internet of objects vary and have been generalized, power consumption is an issue in managing a plurality of devices in one electronic device. For example, when one electronic device periodically scans a plurality of devices for an Internet of objects, power consumption of the electronic device increases according to the type of device and the scan period.

Therefore, there is a need for a method of effectively managing a plurality of registered devices in an electronic device.

SUMMARY

The present disclosure has been made to address the above-mentioned problems and disadvantages, and to provide at least the advantages described below. Accordingly, an aspect of the present disclosure provides a method and an apparatus for determining a time when a scan function is activated in an electronic device.

Another aspect of the present disclosure provides a method and an apparatus for determining a period when a scan function is activated in an electronic device.

Another aspect of the present disclosure provides a method and an apparatus for registering, in an electronic device, information concerning an activation time of a scan function and information to be received by a server from another electronic device.

Another aspect of the present disclosure provides a method and an apparatus for receiving, from another electronic device, an advertisement message corresponding to information to be received when a scan function is activated in an electronic device.

Another aspect of the present disclosure provides a method and an apparatus for deactivating, in an electronic device, a scan function when an activation period expires.

According to an aspect of the present disclosure, a method of a first electronic device comprises transmitting information indicating scan time information of the first electronic device and information to be scanned, to a server through a first communication module, and activating a scan function of a second communication module at a time corresponding to the scan time information, in order to receive the information to be scanned from the second electronic device receiving the information indicating the scan time information of the first electronic device and the information to be scanned by the first electronic device, from the server.

According to an aspect of the present disclosure, a method of a server comprises receiving information indicating scan time information of a first electronic device and information to be scanned by the first electronic device, from the first electronic device, and transmitting the received information indicating the scan time information and the information to be scanned, to a second electronic device.

According to an aspect of the present disclosure, a method of a second electronic device comprises receiving information indicating scan time information of a first electronic device and information to be scanned by the first electronic device, from a server, and transmitting the information to be scanned by the first electronic device to the first electronic device at a time corresponding to the scan time information.

According to an aspect of the present disclosure, an apparatus of a first electronic device comprises a communication interface that transmits information indicating scan time information of the first electronic device and information to be scanned, to a server through a first communication module, and a scan function activating module that activates a scan function of a second communication module at a time corresponding to the scan time information, in order to receive the information to be scanned from the second electronic device receiving the information indicating the scan time information of the first electronic device and the information to be scanned by the first electronic device, from the server.

According to an aspect of the present disclosure, an apparatus of a server comprises a communication interface that receives information indicating scan time information of a first electronic device and information to be scanned by the first electronic device from the first electronic device, and transmits the received information indicating the scan time information and the information to be scanned, to a second electronic device.

According to an aspect of the present disclosure, an apparatus of a second electronic device comprises a communication interface that receives information indicating scan time information of a first electronic device and information to be scanned by the first electronic device, from a server, and transmits the information to be scanned by the first electronic device to the first electronic device at a time corresponding to the scan time information.

BRIEF DESCRIPTION OF THE DRAWINGS

The above and other aspects, features, and advantages of the present disclosure will be more apparent from the following detailed description, taken in conjunction with the accompanying drawings, in which:

FIG. 9 is an illustration of a protocol according to an embodiment of the present disclosure.

DETAILED DESCRIPTION OF EMBODIMENTS OF THE PRESENT DISCLOSURE

Figure 1:
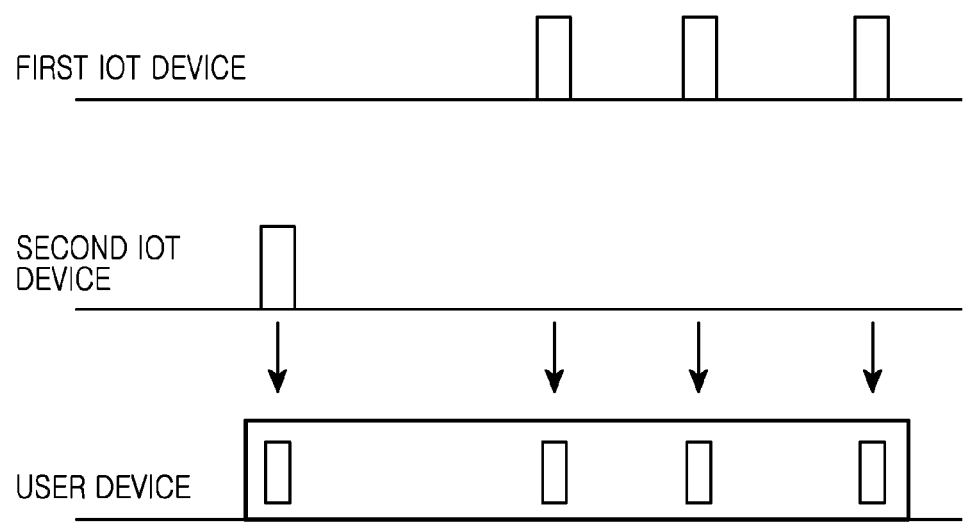
FIG. 1 is an illustration of a user device scanning for advertisement messages from two devices on an Internet of Things (IoT) according to an embodiment of the present disclosure.

Hereinafter, various embodiments of the present disclosure are described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In the description below of the accompanying drawings, similar reference numerals may be used to designate similar elements.

As used herein, the expressions "have," "may have," "include," or "may include," refer to the existence of a corresponding feature (e.g., a numeral, a function, an operation, or a constituent element such as a component), and do not exclude one or more additional features.

As used herein, the expressions "A or B," "at least one of A and/or B," or "one or more of A and/or B" may include any or all possible combinations of items enumerated together. For example, the expressions "A or B," "at least one of A and B" or "at least one of A or B" may include (1) at least one A, (2) at least one B, or (3) both at least one A and at least one B.

The expression "a first," "a second," "the first," or "the second" used in various embodiments of the present disclosure may modify various components regardless of the order and/or the importance but does not limit the corresponding components. The above expressions are used merely for the purpose of distinguishing an element from another element. For example, a first user device and a second user device may indicate different user devices regardless of the sequence or importance thereof. For example, a first element could be referred to as a second element, and similarly, a second element could be referred to as a first element without departing from the scope and spirit of the present disclosure.

When it is indicated that an element (e.g., a first element) is "(operatively or communicatively) coupled with/to or connected to" another element (e.g., a second element), it should be construed that the element is directly connected to the other element or the element is indirectly connected to the other element via yet another element (e.g., a third element). Conversely, when it is indicated that an element (e.g., a first element) is "directly coupled" or "directly connected" to another element (e.g., a second element), it may be construed that no other element exists between the element and the other element.

The expression "configured to" used in the present disclosure may be replaced with, for example, "suitable for," "having the capacity to," "designed to," "adapted to," "made to," or "capable of" according to the situation. The term "configured to" may not necessarily imply "specifically designed to" in hardware. Alternatively, in some situations, the expression "device configured to" may indicate that the device, together with other devices or components, "is able to." For example, the phrase "processor adapted (or configured) to perform A, B, and C" may refer to a dedicated processor (e.g. an embedded processor) only for performing the corresponding operations or a general purpose processor (e.g., a Central Processing Unit (CPU) or Application Processor (AP)) that can perform the corresponding operations by executing one or more software programs stored in a memory device.

The terms used in the present disclosure are only used to describe certain embodiments of the present disclosure, and are not intended to limit the present disclosure. A singular expression may include a plural expression, unless the context clearly indicates otherwise. Unless clearly defined otherwise, all terms used herein, including technical terms and scientific terms, may have the same meanings as commonly understood by a person of ordinary skill in the art to which the present disclosure pertains. Such terms as those defined in a generally used dictionary are to be interpreted to have the meanings equal to the contextual meanings in the relevant field of the art, and are not to be interpreted to have ideal or excessively formal meanings unless clearly defined in the present disclosure. In some cases, even a term defined in the present disclosure should not be interpreted to exclude embodiments of the present disclosure.

For example, an electronic device may include at least one of a smartphone, a tablet Personal Computer (PC), a mobile phone, a video phone, an electronic book (e-book) reader, a desktop PC, a laptop PC, a netbook computer, a Personal Digital Assistant (PDA), a Portable Multimedia Player (PMP), a Moving Picture Experts Group Audio Layer 3 (MP3) player, a mobile medical appliance, a camera, and a wearable device (e.g., a Head-Mounted-Device (HMD) such as electronic glasses, electronic clothes, an electronic bracelet, an electronic necklace, an electronic appcessory, electronic tattoos, or a smart watch).

According to some embodiments of the present disclosure, the electronic device may be a smart home appliance. The smart home appliance may include at least one of, for example, a television, a Digital Video Disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment of the present disclosure, the electronic device may include at least one of various medical devices (e.g., various portable medical measuring devices (e.g., a blood glucose monitoring device, a heart rate monitoring device, a blood pressure measuring device, a body temperature measuring device, etc.), a Magnetic Resonance Angiography (MRA) machine, a Magnetic Resonance Imaging (MRI) machine, a Computed Tomography (CT) machine, and an ultrasonic machine), a navigation device, a Global Positioning System (GPS) receiver, an Event Data Recorder (EDR), a Flight Data Recorder (FDR), a vehicle infotainment device, an electronic device for a ship (e.g., a navigation device for a ship, and a gyro-compass), avionics, security devices, an automotive head unit, a robot for home or industry, an Automatic Teller Machine (ATM), a Point of Sale (POS) device in a vending location, or a device for the Internet of Things (e.g., a light bulb, various sensors, an electric or gas meter, a sprinkler device, a fire alarm, a thermostat, a streetlamp, a toaster, sporting goods, a hot water tank, a heater, a boiler, etc.).

According to an embodiment of the present disclosure, the electronic device may include at least one of a part of furniture or a building/structure, an electronic board, an electronic signature receiving device, a projector, and various kinds of measuring instruments (e.g., a water meter, an electric meter, a gas meter, and a radio wave meter). An electronic device according to an embodiment of the present disclosure may be a combination of one or more of the aforementioned various devices. An electronic device according to an embodiment of the present disclosure may be a flexible device. Further, an electronic device according to an embodiment of the present disclosure is not limited to the aforementioned devices, and may include a subsequently developed electronic device.

Hereinafter, an electronic device according to an embodiment of the present disclosure is described with reference to the accompanying drawings. In the present disclosure, the term "user" may indicate a person using an electronic device or a device (e.g. an artificial intelligence electronic device) using an electronic device.

FIG. 1 is an illustration of a user device scanning for advertisement messages from two devices on an Internet of Things (IoT) according to an embodiment of the present disclosure.

Referring to FIG. 1, an IoT device, which is a device capable of using the Internet, may transmit an advertisement message according to a period configured in the device for transmitting an advertisement message. For example, a first IoT device broadcasts an advertisement message according to a period for transmitting an advertisement message that is configured in the first IoT device, and a second IoT device broadcasts an advertisement message according to a period for transmitting an advertisement message that is configured in the second IoT device. In this case, the advertisement message transmission period of the first IoT device may be different from the advertisement message transmission period of the second IoT device.

In addition, the user device (e.g., a smart phone) may activate a scan function according to a period of time (e.g. a scan period) configured for a user device in advance, maintain an activation state (e.g., continue to operate the user device) during the scan period when the scan function is activated (e.g. a scan function activation period) to determine whether an advertisement message is received from an IoT device during the scan period.

If a time when a user device scans for an advertisement message from an IoT device is different from a time when the IoT device transmits the advertisement message, the user device cannot receive the desired information (e.g., the advertisement message) from the IoT device. In order to receive the desired information from the IoT device, a scan function activation period of the user device may be changed from short to long. However, this would increase the power consumption of the user device.

In order to resolve such problems, in the present disclosure, a method of reducing power consumption according to scan function performance is described. In the method, the user device detects, in advance, the times when an IoT device will transmit an advertisement message, and, as shown in FIG. 1, the scan function of the user device is activated only when the IoT device transmits the advertisement message.

For convenience of description, a user device is referred to below as a first electronic device and an IoT device is referred to as a second electronic device.

Figure 2:
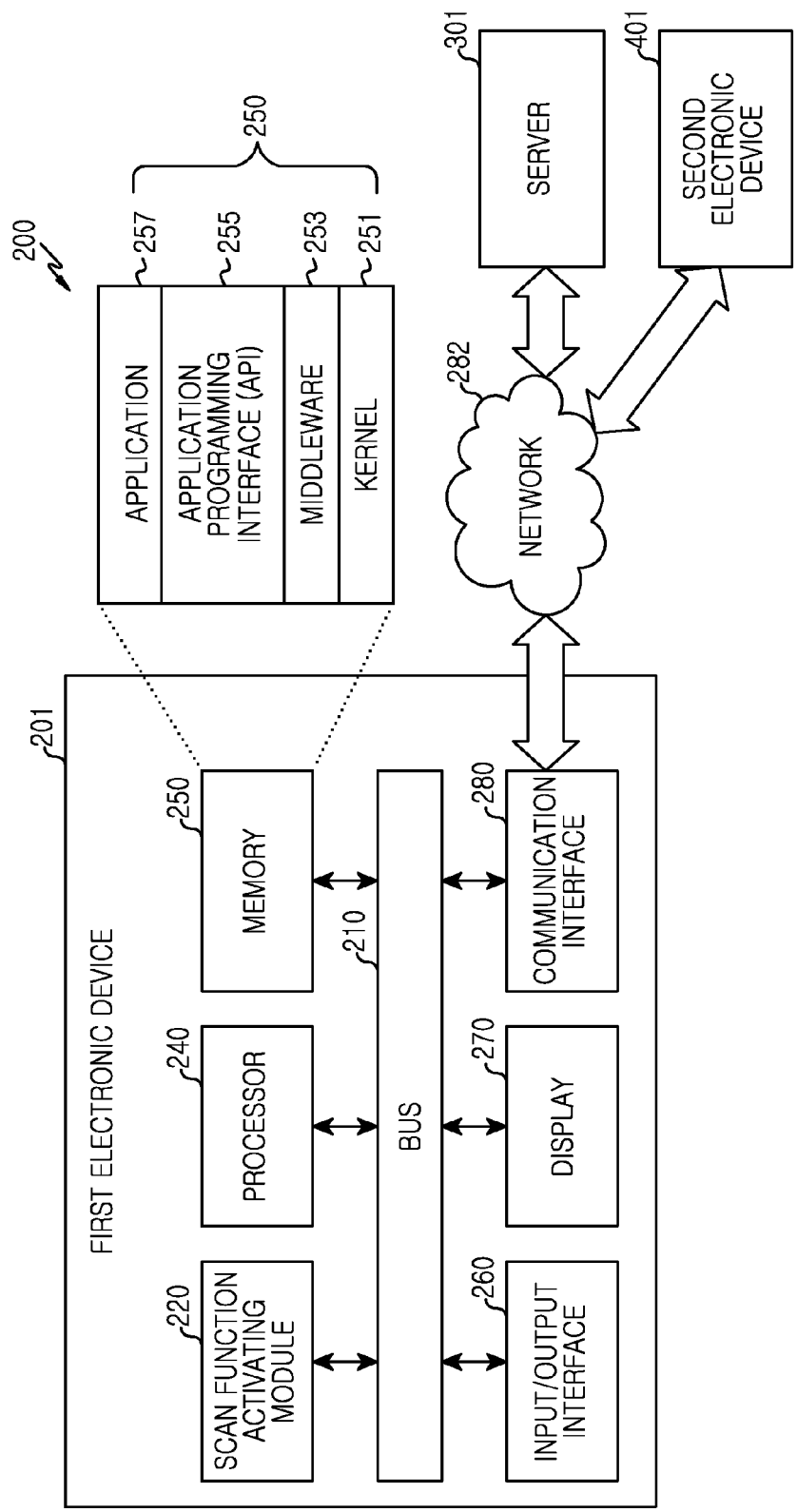
FIG. 2 is a block diagram of a network environment including a first electronic device according to an embodiment of the present disclosure.

FIG. 2 is a block diagram of a network environment 200 including a first electronic device 201 according to an embodiment of the present disclosure.

Referring to FIG. 2, the first electronic device 201 includes a bus 210, a scan function activating module 220, a processor 240, a memory 250, an input/output interface 260, a display 270, and a communication interface 280.

The bus 210 connects elements of the first electronic device 201 and transfers communication (e.g., a control message) among the elements of the first electronic device 201.

The scan function activating module 220 receives scan time information of the first electronic device 201 and an identification of information to be scanned by the first electronic device 201. In this case, the scan time information includes a time when the scan function of the first electronic device 201 is to be activated (e.g. a time when the first electronic device 201 starts to scan), and a period when the scan function is activated (e.g. a duration of a scan). The identification of information to be scanned by the first electronic device 201 includes a type, a kind, an item and/or a clause related to the information to be scanned, and further includes an identification of a second electronic device that is to transmit the information to be scanned.

Then, the scan function activating module 220 transmits the received scan time information of the first electronic device 201 and the identification of the information to be scanned by the first electronic device 201, where the information to be scanned is by the second electronic device 401, to a server 301 in which at least one second electronic device is registered. That is, the scan function activating module 220 transmits scan time information of the first electronic device 201 and an identification of information to be transmitted by the second electronic device 201 to the server 301 in which the second electronic device 401 is registered, in order for the server 301 to control the second electronic device 401 such that the second electronic device 401 only transmits the information to be scanned by the first electronic device 201 at a time when the scan function of the first electronic device 201 is activated to scan for the information.

Then, the scan function activating module 220 activates the scan function of the first electronic device 201 at the scan time (e.g. the start time for the scan) to receive the information transmitted by the second electronic device 401. In this case, the information transmitted by the second electronic device 401 may be an advertisement message broadcast by the second electronic device 401.

In addition, the scan function activating module 220 deactivates the scan function of the first electronic device 201 when the scan period expires.

The processor 240, for example, receives instructions from other elements (e.g., the scan function activating module 220, the memory 250, the input/output interface 260, the display 270, the communication interface 280, and the like) through the bus 210, decodes the received instructions, and executes an operation or processes data according to the decoded instructions.

The memory 250 stores instructions or data received from the processor 240 or other elements (e.g., the scan function activating module 220, the memory 250, the input/output interface 260, the display 270, the communication interface 280, and the like) or generated by the processor 240 or other elements (e.g., the scan function activating module 220, the memory 250, the input/output interface 260, the display 270, the communication interface 280, and the like). The memory 250, for example, may include programming modules such as a kernel 251, middleware 253, an Application Programming Interface (API) 255, or an application 257. Each of the programming modules may be configured by software, firmware, hardware, or a combination of two or more thereof.

The input/output interface 260 transfers an instruction or data input from a user through an input device (e.g., a sensor, a keyboard, or a touch screen), to the scan function activating module 220, the processor 240, the memory 250, or the communication interface 280 through, for example, the bus 210. For example, the input/output interface 260 provides, to the processor 240, data associated with a touch of a user input through a touch screen.

The display 270 displays various pieces of information (e.g., multimedia data, text data, etc.) to a user. For example, the display 270 displays instructions or data received from the scan function activating module 220, the processor 240, the memory 250 and the communication interface 280 through the bus 210.

The communication interface 280 establishes communication between the first electronic device 201 and an external device (e.g., the server 301 or the second electronic device 401). For example, the communication interface 280 is connected to a network 282 through wireless communication, and communicates with the server 301 or the second electronic device 401. For example, the wireless communication may include at least one of Wireless Fidelity (Wi-Fi), Bluetooth (BT), Bluetooth Low Energy (BLE), Near Field Communication (NFC), a satellite communication (e.g., a GPS), or a cellular communication (e.g., Long Term Evolution (LTE), LTE Advanced (LTE-A), Code Division Multiple Access (CDMA), Wideband CDMA (WCDMA), Universal Mobile Telephone System (UMTS), Wireless Broadband (WiBro), Global System for Mobile Communication (GSM), or the like).

According to an embodiment of the present disclosure, the first electronic device 201 transmits the scan time information of the first electronic device 201 and identification of the information to be scanned by the first electronic device 201 (i.e., the information to be transmitted by the second electronic device 401) to the server 301 through a Wi-Fi module. In addition, the first electronic device 201 receives an advertisement message (i.e., the information to be scanned by the first electronic device 201) from the second electronic device 401 through a Bluetooth Low Energy (BLE) module or a Bluetooth (BT) module.

According to an embodiment of the present disclosure, a protocol (e.g., a transport layer protocol, a data link layer protocol or a physical layer protocol) for a communication among the first electronic device 201, the server 301 and the second electronic device 401 may be supported by at least one of the application 257, the API 255, the middleware 253, and the kernel 251, which is included in the memory 250, or the communication interface 280.

Figure 3:
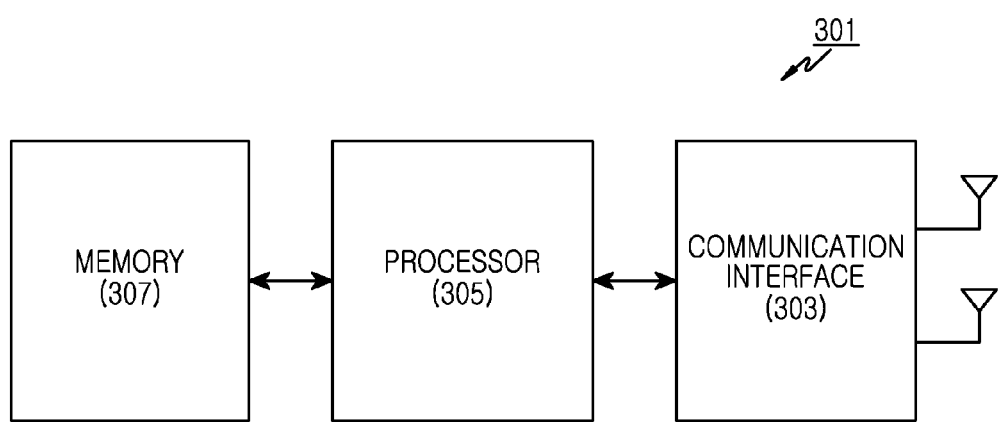
FIG. 3 is a block diagram of a server according to an embodiment of the present disclosure.

FIG. 3 is a block diagram of a server 301 according to an embodiment of the present disclosure.

Referring to FIG. 3, the server 301 includes a communication interface 303, a processor 305 and a memory 307.

The communication interface 303 establishes a communication between the server 301 and an external device (e.g., the first electronic device 201 or the second electronic device 401). For example, the communication interface 303 is connected to a network through a wireless communication, and communicates with the first electronic device 201 or the second electronic device 401. For example, the wireless communication includes at least one of Wireless Fidelity (Wi-Fi), Bluetooth (BT), Bluetooth Low Energy (BLE), Near Field Communication (NFC), a satellite communication (e.g., a GPS), or a cellular communication (e.g., LTE, LTE-A, CDMA, WCDMA, UMTS, WiBro, GSM, or the like).

The communication interface 303, according to an embodiment of the present disclosure, receives the scan time information of the first electronic device 201 (i.e., the times when the first electronic device 201 scans for a transmission sent to it by a second electronic device 401) and the identification of information to be scanned by the first electronic device 201 (i.e., identification of what the second electronic device 401 will transmit to the first electronic device 201), from the first electronic device 201, and transmits the scan time information of the first electronic device 201 and the identification of the information to be scanned by the first electronic device 201 to at least one second electronic device 401 registered in the server 301.

The processor 305 controls the overall operation of the server 301. In this case, the processor 305, according to an embodiment of the present disclosure, controls the server 301 to receive the scan time information of the first electronic device 201 and the identification of the information to be scanned by the first electronic 201 device from the first electronic device 201 and transmits the received information to the second electronic device 401. When the first electronic device 201 attempts to scan for information from two or more second electronic devices 401, the processor 305 controls the server 301 to transmit the identification of the information to be scanned by the first electronic device 201 (i.e., the identification of what a second electronic device is to transmit to the first electronic device 201) and the scan time information of the first electronic device 201 (i.e., the time when the first electronic device will be scanning for a transmission from a second electronic device 401) to two or more second electronic devices 401. For example, as a result of the identification of the information to be scanned by the first electronic device 201, when the first electronic device 201 desires to receive information from a second electronic device "A" 201 (e.g. a transmission from the second electronic device "A" 201) and information from another second electronic device "B" 201 (e.g. a transmission from the other second electronic device "B" 201), the processor 305 controls the server 301 to transmit to the second electronic device "A" and the other second electronic device "B," respectively, the scan time information of the first electronic device 201 and the identification of the information to be transmitted by the second electronic device "A" 201 and the identification of the information to be transmitted by the other second electronic device "B" 201. In this case, the scan times may be different for the information to be transmitted by the second electronic device "A" 201 and the information to be transmitted by the other second electronic device "B" 201.

The memory 307 stores instructions or data received from the processor 305 and the communication interface 303 or instructions or data generated by the processor 305 and the communication interface 303. The memory 307 may include programming modules such as a kernel, middleware, an Application Programming Interface (API), or an application. Each of the programming modules may be configured by software, firmware, hardware, or a combination of two or more thereof. The memory 307, according to an embodiment of the present disclosure, stores information for at least one second electronic device 401 registered in the server 301.

Figure 4:
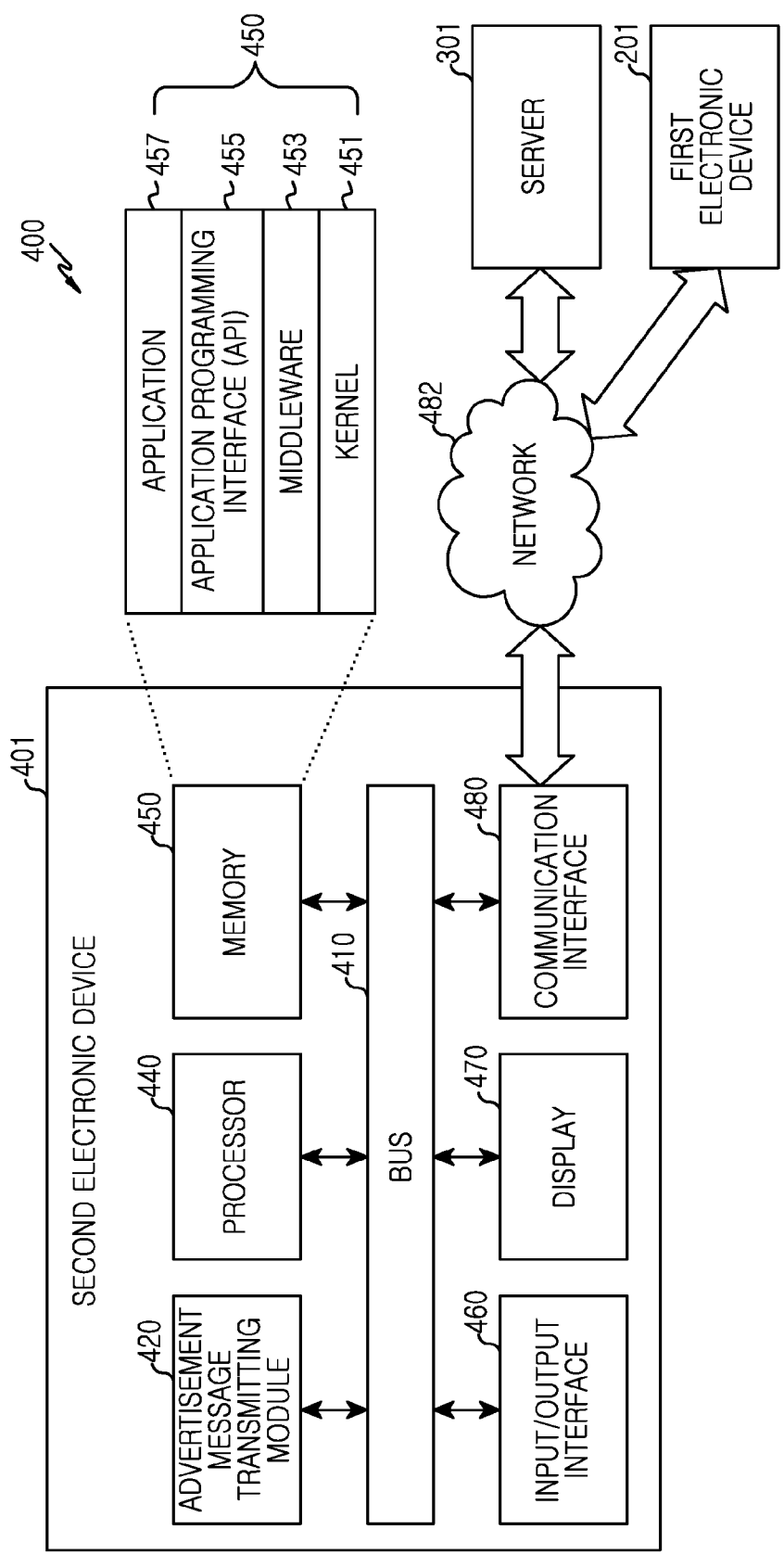
FIG. 4 is a block diagram of a network environment including a second electronic device according to an embodiment of the present disclosure.

FIG. 4 is a block diagram of a network environment 400 including a second electronic device 401 according to an embodiment of the present disclosure.

Referring to FIG. 4, the second electronic device 401 includes a bus 410, an advertisement message transmitting module 420, a processor 440, a memory 450, an input/output interface 460, a display 470, and a communication interface 480.

The bus 410 connects elements of the second electronic device 401 for transferring a communication (e.g., a control message) among the elements of the second electronic device 401.

The advertisement message transmitting module 420 receives scan time information of a first electronic device 201 and identification of information to be scanned by the first electronic device 201 from a server 301. Then, the advertisement message transmitting module 420 determines a time when an advertisement message is to be transmitted to the first electronic device 201 based on the scan time information.

Then, the advertisement message transmitting module 420 transmits the advertisement message which corresponds to the information to be scanned by the first electronic device 201 to the first electronic device 201 at the determined time (e.g. during the scan time of the first electronic device 201). That is, the advertisement message transmitting module 420 broadcasts the advertisement message which corresponds to the information to be scanned by the first electronic device 201 at the determined time (e.g. the scan time of the first electronic device 201) to enable the first electronic device 201 to receive the advertisement message.

The processor 440, for example, receives instructions from other elements (e.g., the advertisement message transmitting module 420, the memory 450, the input/output interface 460, the display 470, the communication interface 480, and the like) through the bus 410, decodes the received instructions, and executes an operation or processes data according to the decoded instructions.

The memory 450 stores instructions or data received from the processor 440 or other elements (e.g., the advertisement message transmitting module 420, the memory 450, the input/output interface 460, the display 470, the communication interface 480, and the like) or generated by the processor 440 or other elements (e.g., the advertisement message transmitting module 420, the memory 450, the input/output interface 460, the display 470, the communication interface 480, and the like). The memory 450, for example, includes programming modules such as a kernel 451, middleware 453, an Application Programming Interface (API) 455, or an application 457. Each of the programming modules may be configured by software, firmware, hardware, or a combination of two or more thereof.

The input interface 460 transfers an instruction or data input from a user through an input device (e.g., a sensor, a keyboard, or a touch screen), to the advertisement message transmitting module 420, the processor 440, the memory 450, or the communication interface 480 through, for example, the bus 410. For example, the input/output interface 460 provides, to the processor 440, data associated with a touch of a user input through a touch screen.

The display 470 displays various types of information (e.g., multimedia data, text data, etc.) to a user. For example, the display 470 displays instructions or data received from the advertisement message transmitting module 420, the processor 440, the memory 450 and the communication interface 480 through the bus 410.

The communication interface 480 establishes communication between the second electronic device 401 and an external device (e.g., the server 301 or the first electronic device 201). For example, the communication interface 480 is connected to a network 482 through wireless communication, and communicates with the server 301 or the first electronic device 201. For example, the wireless communication includes at least one of Wireless Fidelity (Wi-Fi), Bluetooth (BT), Bluetooth Low Energy (BLE), Near Field Communication (NFC), a satellite communication (e.g., a GPS), or a cellular communication (e.g., LTE, LTE-A, CDMA, WCDMA, UMTS, WiBro, GSM, or the like).

According to an embodiment of the present disclosure, a protocol (e.g., a transport layer protocol, a data link layer protocol or a physical layer protocol) for communication among the second electronic device 401, the server 301 and the first electronic device 201 is supported by at least one of the application, the API, the middleware, the kernel included in the memory 450, or the communication interface 480.

According to an embodiment of the present disclosure, the second electronic device 401 receives the scan time information of the first electronic device 201 and identification of the information to be scanned by the first electronic device 201 from the server 301 through a Wi-Fi module. In addition, the second electronic device 401 transmits an advertisement message to the first electronic device 201 through a Bluetooth Low Energy (BLE) module or a Bluetooth (BT) module.

Figure 5:
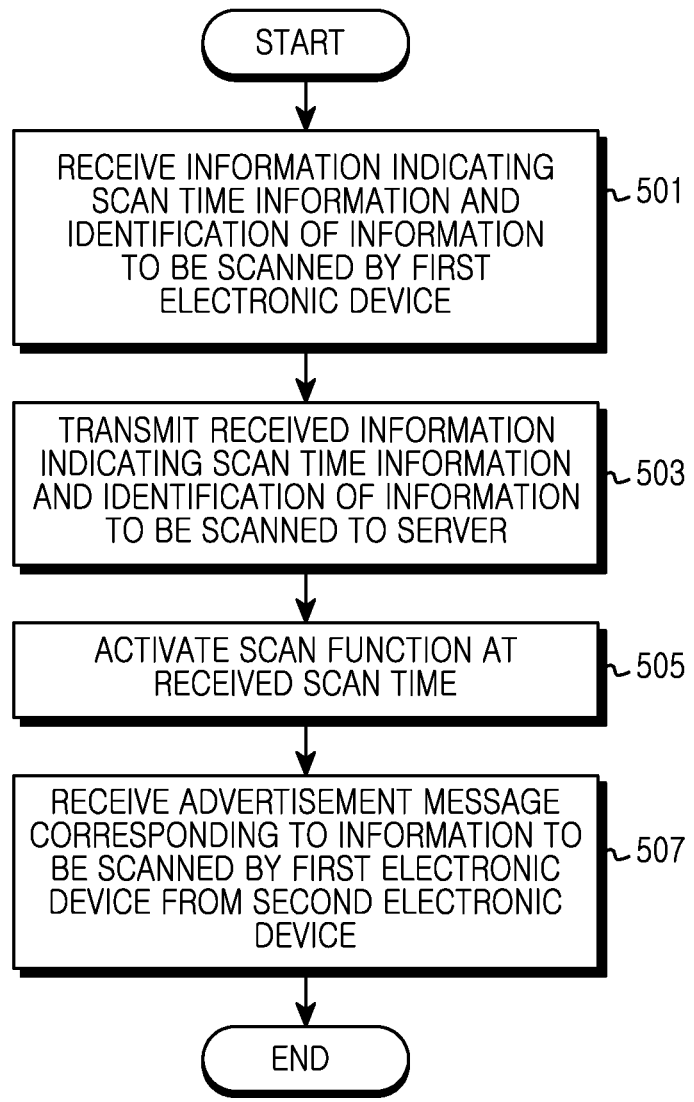
FIG. 5 is a flowchart of a method of a first electronic device according to an embodiment of the present disclosure.

FIG. 5 is a flowchart of a method of a first electronic device 201 according to an embodiment of the present disclosure.

Referring to FIG. 5, in step 501, the first electronic device 201 may receive information indicating scan time information of the first electronic device 201 and an identification of information to be scanned by the first electronic device 201. In this case, the scan time may include a time when the scan function of the first electronic device 201 is activated (e.g. a time to start a scan), and a period during which the scan function scans for information (e.g. a duration of the scan). The identification of information to be scanned by the first electronic device 201 may include a type, a kind, an item and/or a clause related to the information to be scanned, and may further include the identity of the second electronic device 401 that is to transmit the information to be scanned.

Next, in step 503, the first electronic device 201 transmits the scan time information and the identification of the information to be scanned to a server. In an embodiment of the present disclosure, the scan time information and the identification of the information to be scanned are transmitted to the server based on a first communication method (e.g., a Wi-Fi communication module).

Then, in step 505, the first electronic device 201 activates the scan function at the scan time.

Then, in step 507, the first electronic device 201 receives an advertisement message, which corresponds to the information to be scanned by the first electronic device, from the second electronic device through a second communication module. For example, the second communication module may be a Bluetooth Low Energy (BLE) module or a Bluetooth (BT) module. When a scan period expires, the first electronic device 201 deactivates the scan function.

Then, the first electronic device 201 terminates the method according to an embodiment of the present disclosure.

Figure 6:
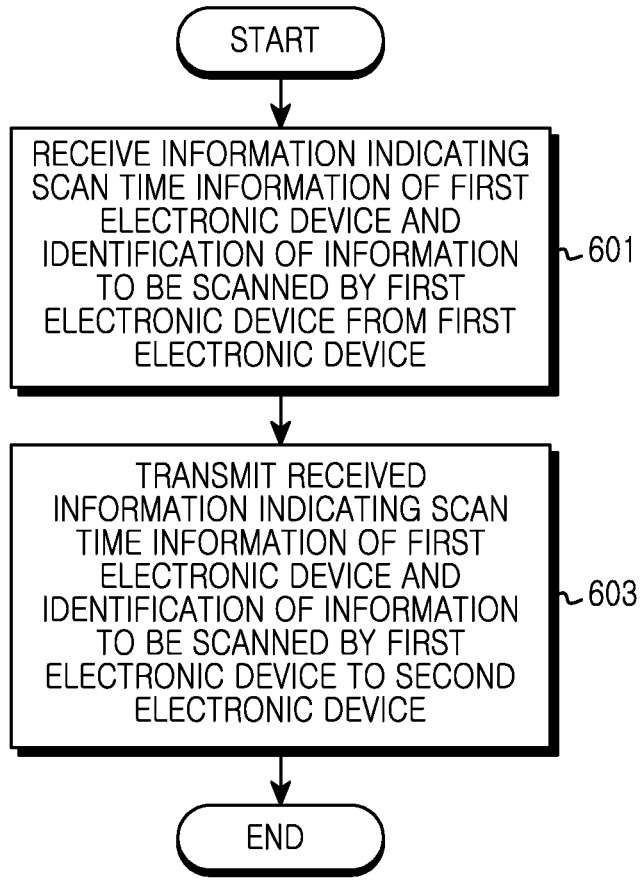
FIG. 6 is a flowchart of a method of a server according to an embodiment of the present disclosure.

FIG. 6 is a flowchart of a method of a server according to an embodiment of the present disclosure.

Referring to FIG. 6, in step 601, the server 301 receives information indicating a scan time of a first electronic device and identification of the information to be scanned by the first electronic device from the first electronic device.

Then, in step 603, the server 301 transmits the scan time information of the first electronic device and the identification of information to be scanned by the first electronic device to the second electronic device. Then, the server 301, from the identification of information to be scanned, identifies the information to be scanned by the first electronic device 201 and the second electronic device to transmit the information to be scanned by the first electronic device 201. For example, in accordance with the identification of the information to be scanned by the first electronic device 201, where the first electronic device 201 desires to receive information from a second electronic device "A," the server 301 transmits to the second electronic device "A," the scan time of the first electronic device 201 and the identification of the information desired to be received by the first electronic device 201 from the second electronic device "A."

Then, the server 301 terminates the method according to an embodiment of the present disclosure.

Figure 7:
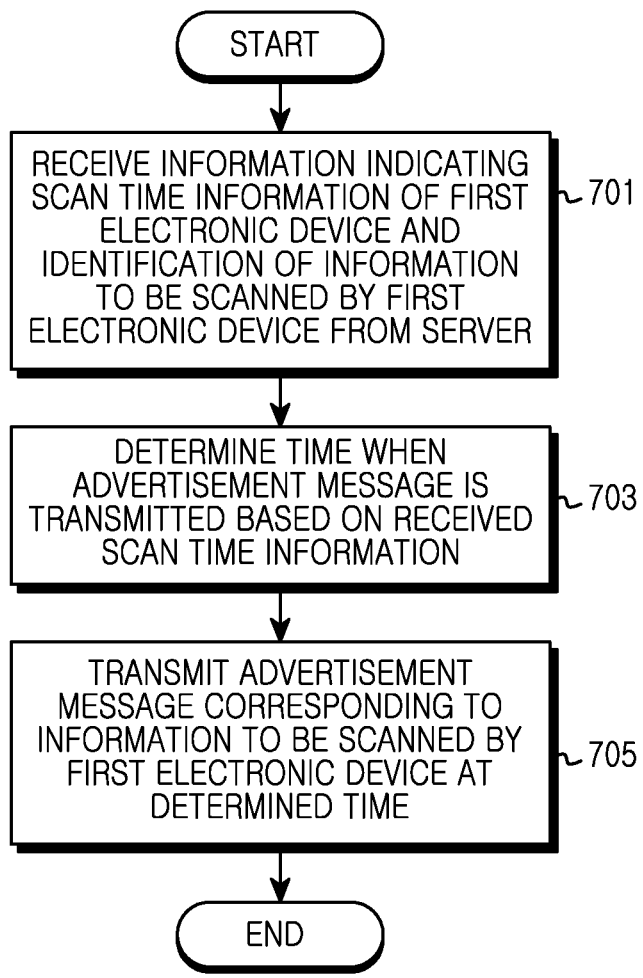
FIG. 7 is a flowchart of a method of a second electronic device according to an embodiment of the present disclosure.

FIG. 7 is a flowchart of a method of a second electronic device according to an embodiment of the present disclosure.

Referring to FIG. 7, in step 701, the second electronic device 401 receives scan time information of the first electronic device 201 and identification of information to be scanned by the first electronic device 201 from the server 301 through a first communication module. The first communication module may be a Wi-Fi communication module.

Then, in step 703, the second electronic device 401 determines a time when an advertisement message is to be transmitted based on the received scan time information.

Then, in step 705, the second electronic device 401 transmits the advertisement message, which corresponds to the information to be scanned by the first electronic device 201, to the first electronic device 201 at the determined time (e.g. at the scan time). In this case, the second electronic device 401 broadcasts the advertisement message, which corresponds to the information to be scanned by the first electronic device 201, at the determined time (e.g. the scan time) to enable the first electronic device 201 to receive the advertisement message. The second communication module may be a Bluetooth Low Energy (BLE) module or a Bluetooth (BT) module.

Then, the second electronic device 401 terminates the method according to an embodiment of the present disclosure.

Figure 8:
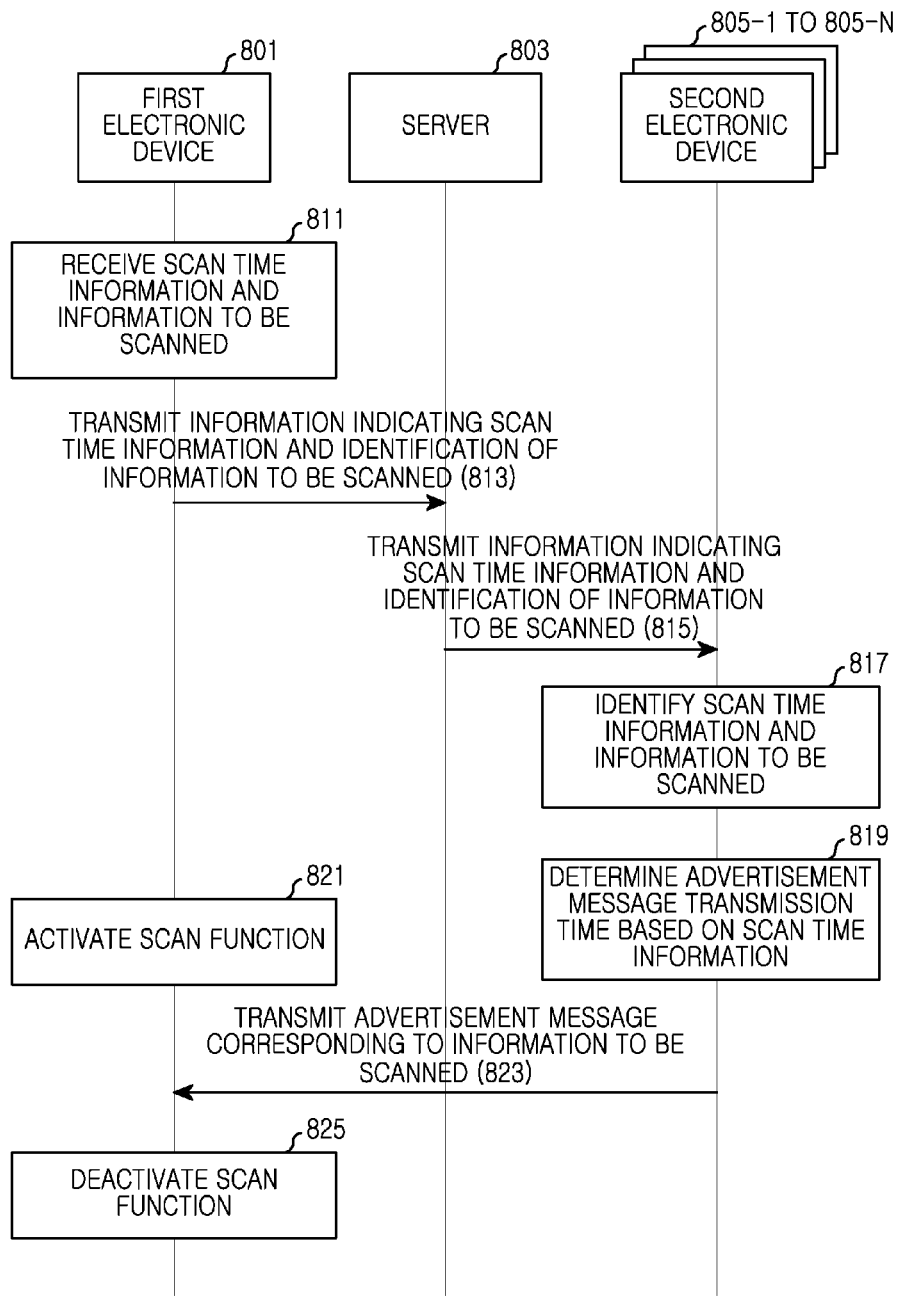
FIG. 8 is a flow diagram of a method of a system according to an embodiment of the present disclosure.

FIG. 8 is a flow diagram of a method of a system according to an embodiment of the present disclosure.

Referring to FIG. 8, in step 811, a first electronic device 801 receives scan time information and an identification of information to be scanned by the first electronic device 801. In this case, the scan time may include information on a time (e.g. a start time) when the scan function of the first electronic device 801 is activated and information on a period during which the scan function is activated (e.g. a duration of a scan). The information to be scanned by the first electronic device 801 may include a type, a kind, an item and/or a clause related to the information to be scanned, and may further include information indicating a second electronic device that is to transmit the information to be scanned by the first electronic device 801.

Then, in step 813, the first electronic device 801 transmits, to the server 803, the scan time and the identification of information to be scanned. In an embodiment of the present disclosure, the scan time and the identification of information to be scanned by the first electronic device 801 may be transmitted using a message type defined for a business operator, in Bluetooth Coexistence (Coex) Protocol.

For example, FIG. 9 is an illustration of a protocol according to an embodiment of the present disclosure.

Referring to FIG. 9, since a message type "6" 901 and a message type "7" 903 are defined for a business operator in Bluetooth Coex Protocol, the scan time information and the identification of information to be scanned is transmitted using the message type "6" 901 and the message type "7" 903.

When the server 803 receives the scan time information and the identification of information to be scanned by the first electronic device 801, the server 803, in step 815, transmits the scan time information and the identification of information to be scanned by the first electronic device 801 to second electronic devices 805-1 to 805-N. From the identification of information to be scanned by the first electronic device 801, the server 803 identifies information that must be received (e.g. scanned) by the first electronic device 801 and identifies the second electronic device required to transmit the information to the first electronic device 801. For example, when the first electronic device 801 desires to receive information from the second electronic device 805-1, the server 803 transmits, to the second electronic device 805-1, the scan time information of the first electronic device 801 and identification of the information desired by first electronic device 801 (e.g. identification of information to be scanned by the first electronic device 801). In another example, when the first electronic device 801 desires to receive information from the second electronic device 805-1 and information from another second electronic device 805-2, the server 803 transmits, to the second electronic device 805-1, the scan time information of the first electronic device 801 and identification of information to be received from the second electronic device 805-1 (e.g. identification of information to be scanned by the first electronic device 801 that is transmitted by the second electronic device 805-1), and transmit, to the other second electronic device 805-2, the scan time information of the first electronic device 801 and identification of to be received from the second electronic device 805-2 (e.g. identification of information to be scanned by the first electronic device 801 that is transmitted by the other second electronic device 805-2).

In step 817, the second electronic devices 805-1 to 805-N identify the scan time information of the first electronic device and the, respective, information to be scanned by the first electronic device 801 (e.g. the information to be transmitted by the second electronic device 805-1 and the information to be transmitted by the other second electronic device 805-2, respectively).

In step 819, the second electronic devices 805-1 to 805-N each determine a time when an advertisement message is transmitted from the second electronic devices 805-1 to 805-N, respectively, based on the scan time information.

In step 821, the first electronic device 801 activates a scan function at the scan time, respectively. That is, the first electronic device 801 activates the scan function at the scan time, respectively, in order to receive the advertisement messages from the second electronic devices 805-1 to 805-N, respectively.

Then, in step 823, the second electronic devices 805-1 to 805-N each broadcast their advertisement message corresponding to the information to be scanned, and the first electronic device 801 receives each corresponding advertisement message.

Then, when a scan period expires, the first electronic device 801, in step 825, deactivates the scan function.

Figure 10:
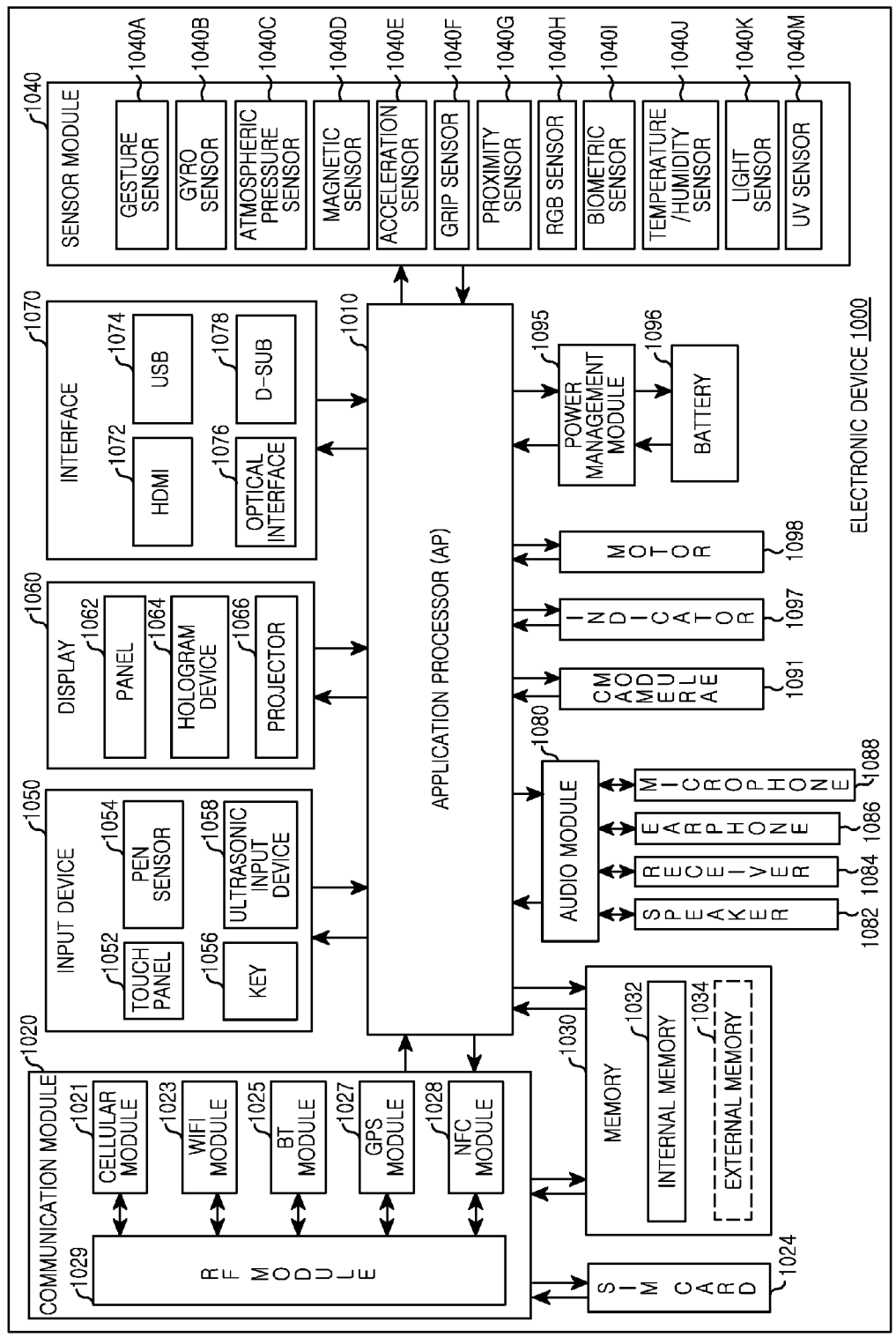
FIG. 10 is a block diagram of an electronic device according to an embodiment of the present disclosure.

FIG. 10 is a block diagram of an electronic device 1000 according to an embodiment of the present disclosure.

The electronic device 1000 may, for example, constitute all or a part of the electronic device 201 shown in FIG. 2.

Referring to FIG. 10, the electronic device 1000 includes at least one of an Application Processor (AP) 1010, a communication module 1020, a Subscriber Identifier Module (SIM) card 1024, a memory 1030, a sensor module 1040, an input device 1050, a display 1060, an interface 1070, an audio module 1080, a camera module 1091, a power management module 1095, a battery 1096, an indicator 1097, and a motor 1098.

The AP 1010 drives an operating system or an application program so as to control a plurality of hardware or software component elements connected to the AP 1010, and executes operations and processes data associated with various data including multimedia data. The AP 1010 may be embodied as, for example, a System on Chip (SoC). According to an embodiment of the present disclosure, the AP 1010 may further include a Graphics Processing Unit (GPU).

The communication module 1020 (e.g., the communication interface 280) performs data transmission/reception in communication between the electronic device 1000 (e.g., the electronic device 201) and other electronic devices (e.g., the server 301 and the second electronic device 401) connected thereto through a network. According to an embodiment of the present disclosure, the communication module 1020 may include a cellular module 1021, a Wi-Fi module 1023, a BlueTooth (BT) module 1025, a Global Positioning System (GPS) module 1027, a Near Field Communication (NFC) module 1028, and a Radio Frequency (RF) module 1029.

The cellular module 1021 provides voice call, video call, Short Message Service (SMS), or Internet service through a communication network (e.g., LTE, LTE-A, CDMA, WCDMA, UMTS, WiBro, or GSM). Further, the cellular module 1021 may distinguish between and authenticate electronic devices in a communication network using, for example, the SIM card 1024. According to an embodiment of the present disclosure, the cellular module 1021 performs at least some of functions provided by the AP 1010. For example, the cellular module 1021 may perform at least some multimedia control functions.

According to an embodiment of the present disclosure, the cellular module 1021 may include a Communication Processor (CP). Further, the cellular module 1021 may, for example, be implemented as an SoC. Although the elements such as the cellular module 1021 (e.g., a CP), the memory 1030, or the power management module 1095 are illustrated to be separate from the AP 1010 in FIG. 10, the AP 1010 may include at least some of the aforementioned elements (e.g., the cellular module 1021) according to an embodiment of the present disclosure.

According to an embodiment of the present disclosure, the AP 1010 or the cellular module 1021 (for example, a CP) may load a command or data received from at least one of a non-volatile memory and other component elements connected thereto to a volatile memory and process the loaded command or data. Further, the AP 1010 or the cellular module 1021 may store data received from or generated by at least one of other elements in a non-volatile memory.

The Wi-Fi module 1023, the BT module 1025, the GPS module 1027, or the NFC module 1028 may include, for example, a processor for processing data transmitted/received through the corresponding module. Although the cellular module 1021, the Wi-Fi module 1023, the BT module 1025, the GPS module 1027, and the NFC module 1028 are illustrated as individual blocks in FIG. 10, at least some (e.g., two or more) of the cellular module 1021, the Wi-Fi module 1023, the BT module 1025, the GPS module 1027, and the NFC module 1028 may be included within one Integrated Circuit (IC) or one IC package. For example, at least some processors corresponding to the cellular module 1021, the WiFi module 1023, the BT module 1025, the GPS module 1027, and the NFC module 1028, respectively (e.g., a CP corresponding to the cellular module 1021 and a WiFi processor corresponding to the WiFi module 1023) may be implemented as one SoC.

The RF module 1029 transmits and receives data, for example, RF signals. The RF module 1029 may include, for example, a transceiver, a Power Amplifier Module (PAM), a frequency filter, a Low Noise Amplifier (LNA), or the like. Further, the RF module 1029 may further include a component for transmitting and receiving an electromagnetic wave in free space by wireless communication, for example, a conductor or a conductive wire. Although the cellular module 1021, the Wi-Fi module 1023, the BT module 1025, the GPS module 1027, and the NFC module 1028 are illustrated to share a single RF module 1029 in FIG. 10, at least one of the cellular module 1021, the Wi-Fi module 1023, the BT module 1025, the GPS module 1027, and the NFC module 1028 may transmit/receive an RF signal through a separate RF module.

The SIM card 1024 is a card in which a Subscriber Identification Module is implemented and is inserted into a slot formed in a predetermined position of the electronic device 1000. The SIM card 1024 includes unique identification information (e.g. an Integrated Circuit Card Identifier (ICCID)) or unique subscriber information (e.g., an International Mobile Subscriber Identity (IMSI)).

The memory 1030 (e.g., the memory 250) may include an internal memory 1032 or an external memory 1034. For example, the internal memory 1032 may include at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, and the like).

According to an embodiment of the present disclosure, the internal memory 1032 may be a Solid State Drive (SSD). The external memory 1034 may further include a flash drive, for example, a Compact Flash (CF) drive, a Secure Digital (SD) card, a Micro Secure Digital (Micro-SD) card, a Mini Secure Digital (Mini-SD) card, an extreme Digital (xD) card, a Memory Stick, or the like. The external memory 1034 may be functionally connected to the electronic device 1000 through various interfaces. According to an embodiment of the present disclosure, the electronic device 1000 may further include a storage device (or a storage medium) such as a hard drive.

The sensor module 1040 measures a physical quantity or senses an operational state of the electronic device 1000 and converts the measured or sensed information into an electrical signal. The sensor module 1040 may include, for example, at least one of a gesture sensor 1040A, a gyro sensor 1040B, an atmospheric pressure sensor 1040C, a magnetic sensor 1040D, an acceleration sensor 1040E, a grip sensor 1040F, a proximity sensor 1040G, a color sensor 1040H (for example, Red, Green, and Blue (RGB) sensor), a biometric sensor 1040I, a temperature/humidity sensor 1040J, a light sensor 1040K, and an Ultra Violet (UV) light sensor 1040M. Additionally or alternatively, the sensor module 1040 may, for example, include an Electronic-nose E-nose sensor, an ElectroMyoGraphy (EMG) sensor, an ElectroEncephaloGram (EEG) sensor, an ElectroCardio-Gram (ECG) sensor, an InfraRed (IR) sensor, an iris sensor, a fingerprint sensor, and the like. The sensor module 1040 may further include a control circuit for controlling one or more sensors included therein.

The input device 1050 may include a touch panel 1052, a (digital) pen sensor 1054, a key 1056, or an ultrasonic input device 1058. The touch panel 1052 recognizes a touch input based on, for example, at least one of a capacitive scheme, a resistive scheme, an infrared scheme, and an acoustic wave scheme. The touch panel 1052 may further include a control circuit. The capacitive touch panel may be able to recognize physical contact or a proximity of a contact. The touch panel 1052 may further include a tactile layer. In this case, the touch panel 1052 may provide a user with a tactile reaction.

The (digital) pen sensor 1054 may be embodied, for example, using a method identical or similar to a method of receiving a touch input of a user, or using a separate recognition sheet. The key 1056 may, for example, include a physical button, an optical key, or a keypad. The ultrasonic input unit 1058 is a unit that can identify data by generating an ultrasonic signal through an input tool (e.g., pen) and detecting a sonic wave through a microphone 1088 in the electronic device 1000, and is capable of wireless recognition. According to an embodiment of the present disclosure, the electronic device 1000 may receive a user input from an external device (for example, a server or an IoT device) connected thereto using the communication module 1020.

The display 1060 (e.g. the display 270) may include a panel 1062, a hologram device 1064, or a projector 1066. For example, the panel 1062 may be a Liquid Crystal Display (LCD), an Active Matrix Organic Light Emitting Diode (AM-OLED) display, or the like. The panel 1062 may, for example, be implemented to be flexible, transparent, or wearable. The panel 1062 may be formed to be a single module with the touch panel 1052. The hologram 1064 may show a three dimensional image in the air by using the interference of light. The projector 1066 displays an image by projecting light onto a screen. The screen may, for example, be located internal or external to the electronic device 1000. According to an embodiment of the present disclosure, the display 1060 may further include a control circuit for controlling the panel 1062, the hologram 1064, or the projector 1066.

The interface 1070 may, for example, include a High-Definition Multimedia Interface (HDMI) 1072, a Universal Serial Bus (USB) 1074, an optical interface 1076, or a D-subminiature (D-sub) connector 1078. The interface 1070 may, for example, be included in the communication interface 280 shown in FIG. 2. Additionally or alternatively, the interface 1070 may, for example, include a Mobile High-definition Link (MHL) interface, a Secure Digital (SD) card/MultiMedia Card (MMC) interface, or an Infrared Data Association (IrDA) standard interface.

The audio module 1080 converts a sound and an electrical signal in a bidirectional manner, that is, converts a sound into an electrical signal and vice versa. At least a part of the audio module 1080, for example, may be in the input interface 260 shown in FIG. 2. The audio module 1080 processes, for example, sound information input or output through a speaker 1082, a receiver 1084, an earphone 1086, a microphone 1088 or the like.

The camera module 1091 is a device for capturing a still image or a video, and according to an embodiment of the present disclosure, may include one or more image sensors (e.g., a front sensor or a rear sensor), a lens, an Image Signal Processor (ISP), or a flash (e.g., an LED or xenon lamp).

The power management module 1095 manages power of the electronic device 1000. The power management module 1095 may include, for example, a Power Management Integrated Circuit (PMIC), a charger Integrated Circuit (IC), or a battery gauge.

The PMIC may be mounted, for example, in integrated circuits or SoC semiconductors. The charging methods may be classified into wired charging and wireless charging. The charger IC can charge a battery and can prevent introduction of over-voltage or over-current from a charger. According to an embodiment of the present disclosure, the charger IC may include a charger IC for at least one of the wired charging method and the wireless charging method. Examples of wireless charging include magnetic resonance charging, magnetic induction charging, and electromagnetic charging, and an additional circuit such as a coil loop, a resonance circuit, and a rectifier may be added for wireless charging.

The battery gauge may, for example, measure the residual capacity, charge in voltage, current, or temperature of the battery 1096. The battery 1096 may store or generate electricity and may supply power to the electronic device 1000 using the stored or generated electricity. The battery 1096 may, for example, include a rechargeable battery or a solar battery.

The indicator 1097 displays a predetermined state of the electronic device 1000 or a part of the electronic device 1000 (for example, the AP 1010), such as a boot-up state, a message state, a charging state, or the like. A motor 1098 converts an electrical signal into a mechanical vibration. The electronic device 1000 may include a processing unit (e.g., a GPU) for supporting mobile TV. The processing device for supporting mobile TV may process media data according to standards such as, for example, Digital Multimedia Broadcasting (DMB), Digital Video Broadcasting (DVB) or a media flow.

According to an aspect of the present disclosure, an electronic device for receiving information is provided, the electronic device includes a transmitter configured to transmit a scan time and an identification of the information to cause the identified information to be broadcast at the scan time and a scanner configured to scan during the scan time to receive the information.

The scan time includes a start time and a duration.

The identification of information includes at least one of a type, a kind, an item, and information associated with the identified information.

The identification of information includes information to identify a device to broadcast the information.

According to an aspect of the present disclosure, a server for conveying a scan time and an identification of information is provided, the server includes a receiver configured to receive a scan time and an identification of information and a transmitter configured to transmit the scan time and the identification of information.

The scan time includes at least one of a start time and a duration.

The identification of information includes at least one of a type, a kind, an item, and information associated with the identified information.

According to an aspect of the present disclosure, a broadcasting device is provided, the broadcasting device a receiver configured to receive a scan time and an identification of information and a transmitter configured to broadcast the identified information at the scan time.

The scan time includes a start time and a duration.

The identification of information includes at least one of a type, a kind, an item, and information associated with the identified information.

The above described components of the electronic device according to various embodiments of the present disclosure may be formed of one or more components, and a name of a corresponding component element may be changed based on the type of electronic device. The electronic device according to various embodiments of the present disclosure may include at least one of the aforementioned elements. Some elements may be omitted or other additional elements may be further included in the electronic device. Further, some of the components of the electronic device according to various embodiments of the present disclosure may be combined to form a single entity, and thus, may equivalently execute functions of the corresponding elements prior to the combination.

The term "module" used in various embodiments of the present disclosure may refer to, for example, a "unit" including one of hardware, software, and firmware, or a combination of two or more of hardware, software, and firmware. The term "module" may be interchangeably used with a term, such as "unit," "logic," "logical block," "component," or "circuit." The term "module" may refer to the smallest unit of an integrated component or a part thereof. The term "module" may refer to the smallest unit that performs one or more functions or a part thereof. The term "module" may refer to a module that is mechanically or electronically implemented. For example, the term "module" according to various embodiments of the present disclosure may include at least one of an Application-Specific Integrated Circuit (ASIC), Field-Programmable Gate Arrays (FPGAs), and a programmable-logic device for performing operations which have been known or may be developed hereafter.

According to various embodiments of the present disclosure, at least a part of a device (for example, modules or functions thereof) or a method (for example, operations) according to the various embodiments of the present disclosure may be embodied by, for example, a command stored in a non-transitory computer readable storage medium in a form of a programming module. When an instruction is implemented by one or more processors (for example, the processor 140), one or more processors may execute a function corresponding to the instruction. The non-transitory computer-readable storage medium may be, for example, the memory 150. At least a part of the programming module may be implemented (for example, executed) by, for example, the processor 140. At least a part of the programming module may include, for example, a module, a program, a routine, a set of instructions and/or a process for performing one or more functions.

The non-transitory computer-readable recording medium may include magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and hardware devices configured to store and perform a program instruction (for example, a programming module), such as a Read Only Memory (ROM), a Random Access Memory (RAM), a flash memory and the like. In addition, program instructions may include high level language codes, which can be executed in a computer by using an interpreter, as well as machine code generated by a compiler. The aforementioned hardware device may be configured to operate as one or more software modules in order to perform an operation of various embodiments of the present disclosure, and vice versa.

A programming module according to the present disclosure may include at least one of the described component elements, where a few of the component elements may be omitted, or additional component elements may be included. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added.

According to various embodiments of the present disclosure, in a storage medium storing instructions, the instructions are configured such that at least one processor performs at least one operation. In this case, at least one operation may include transmitting or receiving at least one signal of a first signal corresponding to a first communication network or a second signal corresponding to a second communication network in an electronic device, and when at least one signal is received, distributing at least one signal to a first communication control module for processing a first signal and a second communication control module for processing a second signal, respectively, based on a service provided by the electronic device and corresponding to the first signal and the second signal.

In an electronic device of the present disclosure, a first electronic device receives information indicating scan time information of the first electronic device and identification of information to be scanned, transmits the scan time information of the first electronic device and the identification of information to be scanned to a server and activates a scan function of the first electronic device only at a time when a second electronic device receiving the scan time information of the first electronic device and the identification of information to be scanned from a server transmits an advertisement message. Thus, the present disclosure can reduce power consumption according to a scan function of the first electronic device.

The embodiments disclosed in the present disclosure and the accompanying drawings are only certain examples provide to easily describe the technical matters of the present disclosure and help with comprehension of the present disclosure, but do not limit the scope of the present disclosure. Therefore, in addition to the embodiments disclosed herein, the scope of the various embodiments of the present disclosure should be construed to include all modifications or modified forms drawn based upon the scope and spirit of the various embodiments of the present disclosure, as defined by the appended claims and their equivalents.

What is claimed is:

1. A method of a first electronic device for receiving information, the method comprising:

transmitting a scan time and an identification of the information to cause the identified information to be broadcast at the scan time to a server; and scanning during the scan time to receive the information from a second electronic device which receives the scan time and the identification of the information from the server and broadcasts the information at the scan time.

2. The method of claim 1, wherein the scan time includes a start time and a duration.

3. The method of claim 1, wherein the identification of information includes at least one of a type, a kind, an item, and information associated with the identified information.

4. The method of claim 3, wherein the identification of information includes information to identify a device to broadcast the information.

5. A method of a server for conveying a scan time and an identification of information, the method comprising:

receiving, from a first electronic device, a scan time and an identification of information to cause the identified information to be broadcast at the scan time; and transmitting, to a second electronic device, the scan time and the identification of information to the second electronic device which broadcasts the information at the scan time.

6. The method of claim 5, wherein the scan time includes at least one of a start time and a duration.

7. The method of claim 5, wherein the identification of information includes at least one of a type, a kind, an item, and information associated with the identified information.

8. A method of a first electronic device for broadcasting information, the method comprising:

receiving, from a server, a scan time and an identification of the information which are transmitted from a second electronic device to the server; and broadcasting the identified information at the scan time.

9. The method of claim 8, wherein the scan time includes a start time and a duration.

10. The method of claim 8, wherein the identification of information includes at least one of a type, a kind, an item, and information associated with the identified information.

* * * * *